United States Patent [19]

Gregory

[11] 3,898,257

[45] Aug. 5, 1975

[54] CHEMICAL COMPOUNDS

[75] Inventor: Maurice James Gregory, Welwyn Garden City, England

[73] Assignee: The Natural Rubber Producers' Research Association, England

[22] Filed: May 2, 1972

[21] Appl. No.: 249,553

[30] Foreign Application Priority Data

May 3, 1971 United Kingdom............... 12798/71

[52] U.S. Cl......... 260/448.8 R; 260/448.2 N; 71/98; 71/121; 71/122; 71/79
[51] Int. Cl. .......... C07f 7/18; C07f 7/08; C07f 7/10
[58] Field of Search............... 260/448.8 R, 448.2 N

[56] References Cited

UNITED STATES PATENTS

| 3,345,393 | 10/1967 | Simmler et al. | 260/448.8 R X |
| 3,597,463 | 8/1971 | Peterson | 260/448.2 N |
| 3,631,194 | 12/1971 | LeGrow | 260/448.8 R X |

*Primary Examiner*—Paul F. Shaver
*Attorney, Agent, or Firm*—Wenderoth, Lind & Ponack

[57] ABSTRACT

Compounds containing the grouping $X-CH_2-CH_2-Si\equiv$ where X is a nucleofugal group, e.g. halogen, phosphate, or sulphonium or ammonium, are useful as plant growth regulating agents, particularly as yield stimulants for *Hevea brasiliensis*.

3 Claims, No Drawings

CHEMICAL COMPOUNDS

This invention relates to chemical compounds useful as plant growth regulators, to plant growth regulating compositions containing them, and to processes or methods of regulating the growth of plants.

The useful effects which can be achieved by applying the compounds of the invention to plants are diverse, as they are with numerous other plant growth regulators, and include the accelerated ripening of fruits, the acceleration of abscission, the breaking of dormancy in buds, shoots, tubers, corms and rhizomes and other plant growth regulation effects. Particularly notable in our experiments is the effect of applying the compounds of the invention to the bark of the rubber tree *Hevea brasiliensis*, which effect is to prolong the flow of latex from the tree on tapping and thereby increase the yield of rubber from the tree.

According to the invention there is provided a process for regulating plant growth, which process comprises applying to the plant an effective amount of a plant growth regulator comprising a compound containing the chemical grouping:

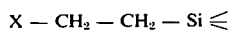  (1)

in which X is a nucleofugal group, for example, a halogen atom or the group,

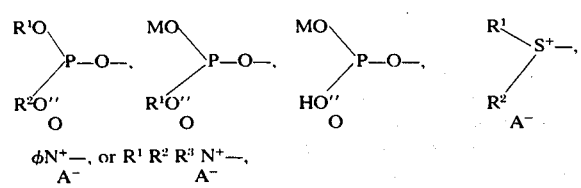

where M is a hydrogen or metal atom or ammonium radical; $R^1$ is a substituted or unsubstituted hydrocarbon group (open chain or cyclic) containing from 1 to 18 carbon atoms; $R^2$ and $R^3$ are defined as (but not necessarily identical with) $R^1$; $\phi N^+$ is a nitrogen-containing substituted or unsubstituted heterocyclic ring linked to carbon via the quaternary nitrogen atom; and $A^-$ is an anion, e.g. chloride, bromide, or methylsulphate. Any anion may be used which is not phytotoxic to the plant being treated at the rate of application of the compounds of the invention which is employed to regulate the growth of the plant.

In heterolytic fragmentation of organic compounds, which is by far the most common type of fragmentation in solution, one group (the nucleofugal group) leaves with the electron pair by which it was originally attached to the rest of the molecule, i.e. as a nucleofuge. This group thereby becomes more negative by one charge unit and is converted into a nucleofugal fragment. This is usually an anion, e.g. halide, sulphonate, phosphate or thiocyanate, but may be a neutral group, e.g. one derived from a pyridinium or ammonium group.

While we do not wish to be bound by any theory of how our invention works, we believe that the silicon compounds with which the invention is concerned act by decomposing in the presence of water in the plant tissues to provide ethylene, and that it is this ethylene which is mainly responsible for exerting the growth regulating effect. We further believe that any compound containing the grouping of formula I above is capable of decomposing in the presence of water to provide ethylene.

It will be appreciated that the rate of decomposition of these silicon compounds is important as far as their growth regulating properties are concerned. In many cases it is believed that the most effective growth regulation is achieved by a controlled slow release of ethylene in the plant tissues, sometimes over a period of a month or more. The rate of decomposition in water of the silicon compounds with which this invention is concerned can be varied over a wide range by an appropriate selection of the group X and of the three groups (other than $-CH_2CH_2X$) attached to the silicon atom. This phenomenon is readily seen by reference to the following data.

| Half lives of various silanes in 0.1M aqueous phosphate buffers at pH 7 and 25°. | |
|---|---|
| Compound | Half-life |
| 2-chloroethyltrimethoxysilane | 20 mins. |
| 2-chloroethyltriisopropoxysilane | 3 weeks |
| 2-chloroethyltri-n-dodecanoxysilane | 2½ hours |
| 2-chloroethyltrimethylsilane | <1 min. |
| ethyl methyl 2-(trimethoxysilyl)-ethyl sulphonium iodide | 14 hours |

It will also be understood that while the rate of decomposition of the silanes in aqueous solution might be expected to influence the rate at which ethylene is generated in the plant tissue, other influences also control this rate. Of equal or greater importance is the diffusion of the silanes from the formulation medium into the aqueous portions of the plant. Thus it would be expected that a solution of an oil soluble/water insoluble silane applied to a plant might under suitable conditions liberate ethylene more slowly than a less reactive water soluble silane applied similarly. This phenomenon is readily seen by reference to the following experiment.

Three *Hevea brasiliensis* seedlings were treated with 2-chloroethyltrimethoxysilane (2 μl) applied as a neat liquid. Three similar seedlings were treated with the same weight of compound applied as a 12% solution in petroleum jelly. The following average yields of rubber were obtained (yield of mg of dry rubber, expressed as a percentage of pretreatment yields in parentheses).

| Time after treatment in days: | 3 | 7 | 12 | 16 | 24 | 30 | 34 | 42 |
|---|---|---|---|---|---|---|---|---|
| Plants treated with neat compound: | 2.1 (230) | 2.2 (245) | 1.3 (145) | 1.1 (122) | 0.9 (100) | 0.8 (90) | 1.2 (134) | 1.0 (112) |
| Plants treated with solution: | 2.2 (160) | 2.3 (164) | 2.3 (164) | 3.0 (215) | 2.2 (160) | 2.3 (164) | 1.8 (128) | 0.9 (65) |

The more prolonged response to the silane in petroleum jelly can be seen from the above data.

The silicon compounds with which the invention is concerned may be regarded as having the formula:

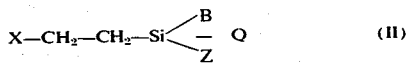

where X has been defined above. B, Q and Z may be all the same or different, and may be selected from the following groups by way of example:
i. halogen, e.g. chlorine or bromine,
ii. alkyl having from 1 to 18 carbon atoms, e.g. methyl, ethyl, isopropyl, tert.-butyl, dodecyl,
iii. alkoxy having from 1 to 18 carbon atoms, e.g. methoxy, ethoxy, isopropoxy, tert.-butoxy, dodecanoxy,
iv. aryl, e.g. phenyl, tolyl,
v. hydroxyl,
vi. thio or alkylthio,
vii. dialkylamino viii)   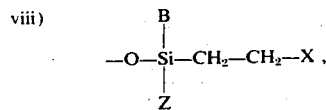

ix. -CH$_2$-CH$_2$-X,
x. substituted alkyl or alkoxy, e.g. acyloxy-, hydroxy- or halogen-substituted alkyl or alkoxy.

This list is not exhaustive, but includes those groups which are likely to be of interest from a commercial standpoint. As stated above, there is no practical restriction on the nature of the groups B, Q and Z.

All these silicon compounds are hydrolysed by water with the production of ethylene. In many cases, however, the first thing that happens when the compounds are mixed with water is the replacement of the groups B, Q or Z with hydroxyl groups. This appears in general to be the case when B, Q and Z are alkoxy, halogen, thiol, alkylthio, dialkylamino or acyloxy groups, but not when B, Q and Z are alkyl or siloxane groups. So, in many cases, the compound which is hydrolysed with the production of ethylene is a 2-substituted-ethyl hydroxy silane.

The group X is a nucleofugal group, and may be selected from the following groups:
i. halogen, e.g. chlorine, bromine or iodine,
ii. orthophosphate or a mono- or di-orthophosphate ester,
iii. disubstituted sulphonium salt, e.g. hexyl methyl sulphonium iodide,
iv. trisubstituted ammonium salt, e.g. trimethylammonium salt or a nitrogen-containing substituted or unsubstituted heterocyclic ring, e.g. a pyridine, piperidine or pyrrolidine salt.

It is surmised that the speed of decomposition of the compounds of formula II may vary as follows when X is changed, the groups B, Q and Z remaining constant:

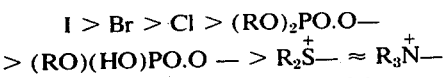

It is further surmised that the speed of decomposition of the compounds of formula II may vary as follows when, say, B is changed, the groups X and, say, Q and Z remaining constant:

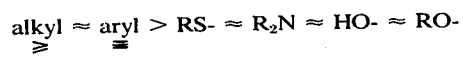

These sequences can only provide, at best, a rough guide to the rate of decomposition of any particular compound.

These silicon compounds vary in physical properties from volatile liquids to crystalline solids. Although the majority of compounds are oil soluble and substantially insoluble in water, water soluble derivatives can be obtained when the group X is ionic in nature, or when B, Q or Z contain hyrophilic groups. While water solutions or suspensions are not normally suitable for the storage or transport of the silicon compounds, due to their susceptibility to decomposition, it may be convenient to make up aqueous compositions for immediate application. Such aqueous compositions should preferably have a pH of not more than 5 in order to minimise the initial unwanted hydrolysis before the compound reaches the plants.

Certain of the silicon compounds falling within the scope of formula II are new compounds, and are included as such in the present invention. Thus, the invention provides, as new compounds, compounds containing the grouping of formula I, where X is:

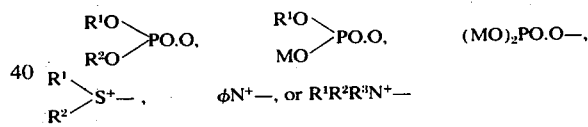

where
M is a hydrogen or metal atom or ammonium radical;
R$^1$ is a substituted or unsubstituted hydrocarbon group (open chain or cyclic) containing from 1 to 18 carbon atoms; R$^2$ and R$^3$ are defined as (but are not necessarily identical with) R$^1$; and $\phi$N$^+$— is a nitrogen-containing substituted or unsubstituted heterocyclic ring linked to carbon via the quaternary nitrogen atom.

These compounds may be made by standard methods. In general, the introduction of the desired nucleofugal group X is effected quite separately from the introduction of the desired groups B, Q and Z. Thus, for example, 2-chloroethyl trichlorosilane may be reacted with up to 3 moles of an alkanol so as to introduce up to 3 alkoxy groups attached to the silicon atom. The resulting compound may then be reacted with further reagents to introduce the desired group X in place of the 2-chlorine atom.

The invention also includes a composition for regulating plant growth, which composition comprises at least one compound containing the grouping of formula I where X is a nucleofugal group, in a liquid solvent or dispersion medium, a viscous oily or greasy medium, or a pulverulent and/or granular solid carrier.

Such compositions may contain, if desired, a surface active agent.

The compositions based on solid carriers may be applied in the form of powder or granules. Suitable solid carriers include, for example, kaolin, talc, bentonite, calcium carbonate, gypsum, magnesia, vermiculite, Fuller's earth and kieselguhr.

Compositions based on liquid carriers may contain water and/or organic liquids as the carrier medium, and the active ingredient may be in the form of a solution, dispersion or emulsion in the liquid carrier.

Surface active agents, if used, may be of the anionic, cationic or non-ionic type. Suitable agents of the anionic type include, for example, fatty acid salts, salts of aliphatic monoesters of sulphuric acid, e.g. sodium dodecyl sulphate, salts of sulphonated aromatic compounds, e.g. sodium dodecylbenzene sulphonate, salts of lignosulphonic acid and salts of alkyl-naphthalene sulphonic acids, e.g. sodium butylnaphthalene sulphonate. Suitable agents of the cationic type include, for example, quaternary ammonium compounds, e.g. cetyltrimethylammonium bromide, dodecyltrimethylammonium chloride. Suitable agents of the non-ionic type include, for example, the condensation products of ethylene oxide with fatty alcohols such as oleyl alcohol, cetyl alcohol and lauryl alcohol, or with alkylphenols such as nonylphenol and octyl cresol. Also included are the partial esters derived from long chain fatty acids and hexitol anhydrides (e.g. sorbitol monolaurate) and the condensation products of such partial esters with ethylene oxide. However, it is not advisable to use non-ionic surfactants containing free hydroxyl groups when the silicon compounds contain groups (B, Q and Z) attached to the silicon atom, such as halogen atoms, which are liable to react chemically with hydroxyl groups.

Compositions which are to be used in the form of solutions, dispersions or emulsions of the active ingredient in a liquid carrier are generally supplied in the form of concentrates containing a high proportion of the active ingredient, the concentrate being diluted with water or an organic liquid before use. It is generally convenient for such concentrates to contain between 10 and 80% by weight of the active ingredient. The concentration of active ingredient in compositions actually applied to the plants (or to the locus of the plants) may vary widely according to the purpose for which they are to be used, but will generally contain between 0.001 and 50% by weight of active ingredient.

The rate of application of the silicon compounds will depend on numerous factors, e.g. the plant species to be treated and the particular compound used, and the optimum rate of application may therefore vary widely according to circumstances. As a general guide, however, a rate of application of 0.1 pounds per acre to 20 pounds per acre of the active ingredient is usually suitable when applied to standing vegetation.

As stated above, the compositions of this invention are particularly advantageous for the treatment of *Hevea brasiliensis* to stimulate the yield and prolong the flow of rubber latex therefrom. A convenient technique is to apply the composition to scraped bark just below the tapping cut.

When treating fully grown trees, it is preferred to apply from 50 mg to 1,000 mg, e.g. from 100 mg to 500 mg, of the silicon compound per tree. The concentration of the compound in the carrier is not critical. It is generally convenient, from a practical viewpoint, to apply a few grams of composition to each tree.

It will generally be found suitable to repeat application of the compounds at from 2 to 6 month intervals.

Advantage may be taken of the yield stimulant effect of those compounds, either by tapping the tree at the same intensity, so as to obtain an increased yield of rubber latex, or by reducing the tapping intensity, and hence labour costs, without loss of yield.

A compound which has come into widespread use, as a stimulant of the yield of rubber latex from *Hevea brasiliensis*, is 2-chloroethyl phosphonic acid sold under the Trade Mark Ethrel. The following advantages attach to some compounds according to the present invention in comparison with Ethrel:

A. Results indicate that some compounds according to the present invention have a greater and longer-lasting effect on latex yield than Ethrel;

B. The compounds of this invention are generally safe compared to Ethrel, which is a strong acid and requires careful handling;

C. Lipophilic compounds of this invention are less likely to be washed off the tree, e.g. by rain, than Ethrel, which is rather water-soluble;

D. The range of compounds of this invention have a wide spectrum of water solubility and of rate of hydrolysis, so that different compounds may be selected suitable for different applications.

The following Examples illustrate the invention. Examples 1 to 15 relate to the preparation of certain silicon compounds falling within the scope of formula II, generally starting from a 2-silylethanol or a 2-silylethyl halide, both known classes of compounds. Examples 16 to 37 illustrate the effect of 2-substituted-ethyl silane compounds as plant growth regulators.

EXAMPLE 1

Preparation of 2-(trimethylsilyl)ethyl diethyl phosphate.

A solution of 2-(trimethylsilyl)ethanol (1.28 g, 0.01 mole), and pyridine (0.79 g, 0.010 mole) in carbon tetrachloride (10 ml) was allowed to react with diethyl phosphorochloridate (0.0105 mole) at 0° overnight. Pyridine hydrochloride was filtered off and the solvent was removed to yield the product as a viscous oil.

Other phosphate esters may be made using this procedure, starting from other alkyl- or aryl-substituted silyl ethanols.

EXAMPLE 2

A. Preparation of 2-hexanethioethyltrimethoxysilane.

Azo-bis-(isobutyronitrile) (3.2 g) was added to a mixture of vinyltrimethoxysilane (80 g) and hexane-1-thiol (64 g). The mixture was warmed to reflux for one-half hour. Distillation of the mixture gave the product as a colourless oil (88 g) b.p. 149°–152°/26 mm.

Other thiol compounds may be made similarly.

B. Preparation of 2-(trimethoxysilyl)ethylhexylmethyl sulphonium iodide.

A solution of 2-hexanethioethyltrimethoxysilane (10 g) and methyl iodide (14 g) in methanol (10 ml) was refluxed for 4 hours. Removal of the methanol by distillation left the product as a brown viscous oil.

EXAMPLE 3

Preparation of 2-(trimethylsilyl)ethylpyridinium bromide.

A solution of 2-bromoethyltrimethylsilane (5 g) was dissolved in pyridine (10 g) and left to react for 2 weeks at room temperature. Removal of the pyridine by distillation at reduced pressure (1 mm Hg) left the product as a brown oil.

EXAMPLE 4

Preparation of 2-(trimethylsilyl)ethyltrimethyl ammonium iodide.

2-(Trimethylsilyl)ethylamine was reacted with methyl iodide (3 moles) in the presence of 2 moles of pyridine.

EXAMPLE 5

Preparation of methylethyl 2-(trimethoxysilyl)-ethyl sulphonium iodide.

a. Preparation of ethyl 2-(trimethoxysilyl)-ethyl sulphide

A stirred mixture of vinyl trimethoxysilane (150 g) and ethanethiol (75 ml) was irradiated at 0° with a 100 watt medium pressure mercury lamp for 2 hours. The mixture was then distilled to give ethyl 2-trimethoxysilyl)-ethyl sulphide (192 g) b.p. 104°–111°/22 mm. (Found: C, 39.4:; H, 8.5%; S, 15.3%. $C_7H_{18}SiO_3$ requires: C, 40.0%; H, 8.6%; S, 15.2%).

b. Preparation of methylethyl 2-(trimethoxysilyl)ethyl sulphonium iodide.

A solution of ethyl 2-(trimethoxysilyl)-ethyl sulphide (2.7 g) and methyl iodide (9.9 g) in methanol (10 ml) was refluxed for 6½ hours. The solvent and excess methyl iodide were removed at reduced pressure to leave a red oil (4.7 g). The oil was washed with ether and on cooling in ice solidifed. The crude sulphonium salt was recrystallised from acetone to give methyl ethyl 2-(trimethoxysilyl)-ethyl sulphonium iodide (3.4 g) m.p. 66°–67°. (Found: C, 26.3%; H, 5.7%; S, 9.1%; $C_8H_{21}SiO_3SI$ requires: C, 26.4%; H, 5.5%; S, 9.1%).

EXAMPLE 6

Preparation of diphenyl 2-(trimethylsilyl)-ethyl phosphate.

A solution of 2-(trimethylsilyl)ethanol (22 g) diphenylphosphorochloridate (44.5 g) and pyridine (13.2 g) in carbon tetrachloride (200 ml) was left at room temperature for 2½ days. The solution was filtered and passed through an alumina column (200 g), eluting with a further 2 × 200 ml of carbon tetrachloride. Removal of the solvent from the eluate left diphenyl 2-(trimethylsilyl)-ethyl phosphate (35.5 g) as a colourless oil. (Found: C, 58.1%; H, 6.6%; P, 8.7%. $C_{17}H_{23}PO_3Si$ requires: $C_1$ 58.3%; H, 6.6%; P, 8.9%).

EXAMPLE 7

Preparation of 2-(trimethoxysilyl)-ethyl pyridinium chloride.

A mixture of pyridine (4.8 g) and 2-chloroethyl-trimethoxysilane (5.65 g) was heated at reflux for 5 hours. Diethyl ether (20 ml) was added to the cooled mixture, and the deliquescent pyridinium salt crystallised out. The NMR spectrum of the salt in $D_2O$ showed eighteen protons, five as a multiplet (3.1 to 2.0 δ) four as a pair of multiplets (0.4 to –0.1 δ, and –2.8 to –3.4 δ) and nine as a singlet (–1.3 δ). Chemical shifts are related to internal water as a standard, and a downfield shift is taken as being positive. (Found: Cl, 13.4% $C_{10}H_{18}SiO_3NCl$ requires 13.5%).

EXAMPLE 8

Preparation of 2-(dimethoxyethylsilyl)-ethyl pyridinium chloride.

A mixture of (2-chloroethyl)dimethoxyethylsilane (5.0 g) and pyridine (4.0 g) were heated at reflux for 4 hours. The product was washed with anhydrous ether (5 × 10 ml) and dried over $P_2O_5$ under vacuum. The product was a deliquescent solid (7.0 g) m.p. 62°–65°. ($C_{11}H_{20}NO_2SiCl$ requires: $Cl^-$ = 13.6%. Found: $Cl^-$ = 13.0%).

EXAMPLE 9

Preparation of 2-(trimethylsilyl)ethyl dihydrogen phosphate di-cyclohexylammonium salt.

A solution in acetonitrile (30 ml) of crystalline phosphoric acid (2.0 g) and triethylamine (4.0 g) was added dropwise over 4 hours to a mixture of 2-(trimethylsilyl)-ethanol (3.0 g) and trichloroacetonitrile (8.65 g) at room temperature. The mixture was left overnight, diluted with acetone (200 ml) and cyclohexylamine (15 ml) was added. The precipitate was collected and recrystallised from water and then ethanol 10% cyclohexylamine to give the cyclohexylammonium salt, (1.3 g) m.p. 252°–255°. ($C_{17}H_{41}H_2SiO_4P$ requires: C, 51% H, 10.4%; N, 7.7%; and a C:N ratio of 7.3. Found: C, 47.6%; H, 10.6%; N, 6.5%; C:N ratio 7.3).

EXAMPLE 10

Preparation of di-n-butyl 2-(di-n-butylmethylsilyl)-ethyl phosphate.

Dibutylphosphorochloridate (3.74 g) was added to a solution of 2-(di-n-butyl methylsilyl)-ethanol (3 g) and pyridine (1.04 g) in carbon tetrachloride (10 ml). The mixture was left overnight, filtered, and the filtrate passed through an alumina column (20 g), eluting with a further 3 × 20 ml of carbon tetrachloride. Removal of the solvent under vacuum left the phosphate as a colourless oil (2.7 g). (Found: C, 58.6%; H, 11.3%; $C_{19}H_{43}SiO_4P$ requires: C, 58.0%; H, 11.0%.

EXAMPLE 11

Preparation of diethyl 2-(diphenyl methylsilyl)-ethyl phosphate

The reaction described in Example 10 was carried out using 2-(diphenylmethylsilyl)-ethanol (2.25 g), diethylphosphorochloridate (1.35 g), and pyridine (0.6 g) in carbon tetrachloride (10 ml). Diethyl 2-(diphenylmethylsilyl)-ethyl phosphate was obtained as a colourless oil (1.35 g) ($C_{17}H_{23}Si O_4P$ requires: C, 60.5%; H, 7.1%; Found: C 63.4%; H, 7.8%).

EXAMPLE 12

Preparation of 2-(dimethoxyphenylsilyl) ethyl hexyl methyl sulphonium iodide.

A solution of 2-(dimethyoxyphenylsilyl)-ethyl hexyl sulphide (8 g) and methyl iodide (25 g) in methanol (10 ml) was heated at reflux for 4 hours. The solvent was removed by distillation and the residual oil was washed with petroleum ether (3 × 20 ml). Residual solvent was removed under vacuum (0.1 mm Hg) to leave the sulphonium salt as a pale yellow hygroscopic oil (9.4 g). (Found: I$^\ominus$, 27.2%; equivalent weight by titration, 432. $C_{17}H_{31}Si\ O_2S\ I$ requires: I$^\ominus$ 28.0%. Equivalent weight 454).

EXAMPLE 13

Preparation of 2-(n-butyldimethoxysilyl) ethyl ethyl methyl sulphonium iodide

A solution of 2-(n-butyldimethoxysilyl)-ethyl ethyl sulphide (8 g) and methyl iodide (35 g) in methanol (15 ml) was heated at reflux for 4 hours. The solvent and excess methyl iodide was removed by distillation to leave a clear yellow oil. This was washed with ether (3 × 25 ml). Residual solvent was removed to leave the sulphonic salt as a yellow hygroscopic oil (11.2 g). Found: I$^\ominus$, 33.9%, equivalent weight by titration 381 $C_{11}H_{27}SiO_2SI$ requires: I$^\ominus$, 33.6%; equivalent weight 378).

EXAMPLE 14

Preparation of ethyl methyl 2-(dimethyl n-pentyloxysilyl) ethyl sulphonium methylsulphate A mixture of ethyl 2-(dimethyl n-pentyloxysilyl) ethyl sulphide (4 g) and dimethyl sulphate (2.15 g) was heated at 90° to 100° for 2 hours. The product was washed with ether (3 × 10 ml) and the residual solvent was removed under vacuum. The salt was obtained as a dark brown hygroscopic oil (4.8 g). Found: Equivalent weight 366 $C_{13}H_{32}Si\ O_5S_2$ requires: equivalent weight 360.

EXAMPLE 15

Preparation of ethyl methyl 2-(triethylsilyl)-ethyl sulphonium iodide.

Ethyl 2-(triethylsilyl) ethyl sulphide (8 g) was reacted with methyl iodide as described in Example 13. The product was a brown viscous oil (10.5 g). (Found: I$^\ominus$, 36.4%, equivalent weight by titration: 352, $C_{11}H_{27}Si\ SI$ requires: I$^\ominus$, 36.8%, equivalent weight, 346).

EXAMPLE 16

2-Chloroethyltrimethoxysilane (2 μl) was applied to each of the stems of three *Hevea brasiliensis* seedlings. Over a period of 2 weeks the increase in yield of dried rubber from these seedlings was 102% relative to the yield from the seedlings for the ten days prior to treatment.

EXAMPLE 17

A solution (17 mg) of 2-chloroethyltrimethoxysilane in petroleum jelly (12% w/w) was applied to three *Hevea brasiliensis* seedlings. Over a period of two weeks, the increase in yield of dried rubber from these seedlings was 52% relative to the yield from the seedlings for the ten days prior to treatment.

EXAMPLE 18

A cream composition was prepared, consisting of:-

-Continued

| | |
|---|---|
| 2-chloroethyltrimethoxysilane | 5% w/w |
| Sorbitol | 20% |
| Arlacel | 10% |
| Mineral oil | 10% |
| Water | 55% |

Such cream compositions are described in Plant Protection Limited British Patent Application No. 48970/71. "Arlacel" is a Registered Trade Mark for sorbitan long chain fatty esters.

0.1 g Aliquots of the cream were spread on aluminium foil and applied to the third internode of tomato plants at the 5–6 leaf stage. The degree of epinasty was assessed after five days, when the mean angle, subtended to the stem, of the leaves was found to be 114°, compared to 54° in untreated plants.

EXAMPLE 19

Alternate leaf blades were removed from Coleus plants bearing four pairs of fully expanded leaves, so that petiole stubs approximately 1.5 cm long were left attached to the main stem. The plants were then sprayed to run-off with a solution of 2-chloroethyltrimethoxysilane containing 0.2 or 0.5% w/v of the silane. The solvent used was 20% v/v acetone in water, and also contained 0.1% v/v of a surface active agent sold under the name of "Lissapol NX" (Lissapol is a Registered Trade Mark for a surface active agent comprising a condensate of ethylene oxide with p-nonyl phenol). Five days after treatment the number of debladed petioles which had fallen off the stems of treated and untreated plants were counted, with the following results.

| Plants treated with:- | Percent petioles abscissed |
|---|---|
| 0.2% 2-chloroethyltrimethoxysilane | 95 |
| 0.5% 2-chloroethyltrimethoxysilane | 100 |
| Solvent only (control) | 7.5 |

EXAMPLE 20

A 0.5% w/v solution of 2-chloroethyltrimethoxysilane, prepared as in Example 19 was painted on to ripe fruits of calamondin (*Citrus mitis*) plants. The solution was applied twice to each fruit, allowing an interval of approximately ten minutes between each application. The pull force necessary to detach each was measured 7 days after treatment, with the following results:

| | Mean pull force (Kg) | % Plugged fruit |
|---|---|---|
| Plants treated with 2-chloroethyltrimethoxysilane | 1.52 | 56 |
| Untreated plants | 2.06 | 75 |

EXAMPLE 21

A 13% w/v solution of 2-chloroethyltrimethoxysilane in palm oil was applied to a 1½ inch wide strip of scraped bark just below the tapping cut of *Hevea brasiliensis* trees (*Clone Tjirandji* 1). The trees were tapped on alternate days using a half-spiral tapping cut. The yield of dried rubber obtained over a seven-week period was measured, with the results shown in Table I.

Table 1

Effect of 2-chloroethyltrimethoxysilane on the yield of rubber from Hevea brasiliensis. Grams of dry rubber per tree per tapping and expressed as percentage of control in parentheses

| Weeks | 1 | 2 | 3 | 4 | 5 | 6 | 7 | Mean |
|---|---|---|---|---|---|---|---|---|
| Trees treated with 13% 2-chloroethyl-trimethoxy-silane | 118.3 (289) | 102 (252) | 107 (211) | 86 (187) | 99 (208) | 72 (99) | 85 (162) | 95 (190) |
| Trees treated with palm oil | 41 | 40 | 51 | 46 | 48 | 73 | 52 | 50 |

EXAMPLE 22

A 5% w/v solution of 2-chloroethyltriisopropoxysilane, prepared in the solvent given in Example 19, was sprayed to run-off on to tomato plants which were at the sixth leaf stage. The degree of epinasty was assessed after five days, when the mean angle, subtended to the stem, of the leaves was found to be 86° compared to 62° in untreated plants.

Example 23

A cream composition was prepared consisting of:-
| | |
|---|---|
| 2-chloroethyltriisopropoxysilane | 5% w/w |
| Sorbitol | 20% |
| Arlacel | 10% |
| Mineral oil | 10% |
| Water | 55% |

0.1 g aliquots of the cream were spread on aluminium foil and applied to the third internode of tomato plants at the 5–6 leaf stage. The degree of epinasty was assessed after five days, when the mean angle, subtended to the stem, of the leaves was found to be 118° compared with 54° in untreated plants.

EXAMPLE 24

Alternate leaf blades were removed from Coleus plants bearing four pairs of fully expanded leaves, so that petiole stubs approximately 1.5 cm long were left attached to the main stem. The plants were then sprayed to run-off with a solution of 2-chloroethyltriisopropoxysilane, prepared as in Example 22. Five days after treatment the number of debladed petioles which had fallen off the stems of treated and untreated plants were counted, with the following results.

| Plants treated with:- | Percent petioles abscissed |
|---|---|
| 0.5% 2-chloroethyltriisopropoxysilane | 63 |
| Solvent only | 7.5 |

EXAMPLE 25

A 19% w/v solution of 2-chloroethyltriisopropoxysilane in palm oil was applied to a 1½ inch wide strip of scraped bark just below the tapping cut of *Hevea brasiliensis* trees (*Clone Tjirandji* 1). The trees were tapped on alternate days using a half spiral tapping cut. The yield of dried rubber obtained over a seven week period was measured, and the results are given in Table 2.

Table 2

The effect of 2-chloroethyltriisopropoxysilane on the yield of rubber from Hevea brasiliensis
Grams of dried rubber per tree per tapping and expressed as a percentage of control in parentheses.

| | Weeks | | | | | | | |
|---|---|---|---|---|---|---|---|---|
| | 1 | 2 | 3 | 4 | 5 | 6 | 7 | Mean for 7 weeks |
| Trees treated with 2-chloroethyltri-isopropoxysilane | 83 (205) | 76 (189) | 83 (164) | 73 (159) | 88 (185) | 93 (128) | 70 (134) | 81 (162) |
| Trees treated with palm oil | 41 | 40 | 51 | 46 | 48 | 73 | 52 | 50 |

EXAMPLE 26

A cream composition was prepared consisting of
| | |
|---|---|
| 2-chloroethyltri-n-dodecanoxysilane | 5% w/w |
| Sorbitol | 20% |
| Arlacel | 10% |
| Mineral oil | 10% |
| Water | 55% |

0.1 g aliquots of the cream was spread on aluminium foil and applied to the third internode of tomato plants at the 5–6 leaf stage. The degree of epinasty was assessed after 5 days, when the mean angle, subtended to the stem of the leaves was found to be 108° compared to 54° in untreated plants.

EXAMPLE 27

A 45% solution of 2-chloroethyltri-n-dodecanoxysilane in palm oil was applied to a 1½ inch wide strip of scraped bark just below the tapping cut of *Hevea brasiliensis* trees (*Clone Tjirandji* 1). The trees were tapped on alternate days using a half spiral tapping cut. The yield of dried rubber obtained over a 7 week period was measured, and the results are given in Table 3.

Table 3

The effect of 2-chloroethyltri-n-dodecanoxysilane on the yield of rubber from Hevea brasiliensis
Grams of dried rubber per tree per tapping and expressed as percentages of control in parentheses

| | Weeks | | | | | | |
|---|---|---|---|---|---|---|---|
| | 1 | 2 | 3 | 4 | 5 | 6 | 7 |
| Trees treated with 2-chloroethyltri-n-dodecanoxysilane | 86 (210) | 81 (201) | 91 (180) | 77 (167) | 87 (183) | 99 (136) | 74 (141) | 85 (169) |
| Trees treated with palm oil | 41 | 40 | 51 | 46 | 48 | 73 | 52 | 50 |

EXAMPLE 28

A 0.5% w/v solution of ethyl methyl 2-(trimethoxysilyl) ethyl sulphonium iodide in water was sprayed to run-off on to tomato plants which were at the sixth leaf stage. The degree of epinasty of the treated plants was assessed 5 days after spraying, when the mean leaf angle subtended to the stem was found to be 86°. The same angle in untreated plants was 62°.

EXAMPLE 29

A cream composition consisting of:

Ethyl methyl 2-(trimethoxysilyl)-ethyl sulphonium iodide
Sorbitol 20%
Arlacel 10%
Mineral oil 10%
Water 55% was prepared. 0.1 g of the cream was spread on aluminium foil and applied to the third internode of tomato plants at the 5-6 leaf stage. The degree of epinasty was assessed five days after application, when the mean angle subtended to the stem of the leaves of the plant was found to be 120° compared to 62° in untreated plants.

EXAMPLE 30

A 23% w/w solution of ethyl methyl 2-(trimethoxysilyl)-ethyl sulphonium iodide in water was applied as to 1½ inch wide strip of scraped bark just below the tapping cut of Hevea brasiliensis. (Clone Tjirandji 1). The trees were tapped on alternate days using a half-spiral tapping cut. Over the 2 weeks after treatment, the mean yield of dried rubber per tapping per tree was found to be 37.8 g, whereas only 28.3 g/tapping/tree was obtained from similar untreated trees used as controls.

EXAMPLES 31 to 34

Solutions of the compounds given in Table 4 in palm oil were applied to a 1½ inch wide strip of scraped bark just below the tapping cut of Hevea brasiliensis trees (Clone Tjirandji 1). The trees were tapped on alternate days using a half-spiral tapping cut. The yield of dried rubber obtained over a 4-week period was measured, with the results shown in Table 4.

Table 4

Effect of various β-substituted ethyl silanes on rubber yields from Hevea brasiliensis

| Example Number | Compound | % active ingredient in palm oil w/w | Mean yield over four weeks a) |
|---|---|---|---|
| 31 | Poly (2-chloroethylmethoxy) siloxane | 10 | 36.8 (174) |
| 32 | 2-Chloroethyldimethoxysilyl acetate | 15 | 41.0 (193) |
| 33 | (2-Chloroethyl) chlorodimethoxysilane | 13 | 35.5 (167) |
| 34 | 2-Chloroethylmethyldimethoxysilane | 12 | 36.6 (173) |
| | Palm oil alone (control) | | 21.2 | a) Expressed as grams of dry rubber per tree per tapping and as percentage of control in parentheses.

EXAMPLES 35 to 37

Hevea brasiliensis trees were treated as in Examples 31 to 34 with solutions of the compounds given in Table 5, in palm oil. Rubber yields are given for a two week period in Table 5.

Table 5

Effect of various β-substituted ethylsilanes on rubber yields from Hevea brasiliensis

| Example Number | Compound | % active ingredient in palm oil | Mean yield over two weeks a) |
|---|---|---|---|
| 35 | Diphenyl 2-(trimethylsilyl)-ethyl phosphate | 20 | 45.5 (194) |
| 36 | Butoxy (2-chloroethyl)-dimethylsilane | 13 | 44.0 (187) |
| 37 | 2-Chloroethyltrimethylsilane | 10 | 37.6 (160) | a) Expressed as grams of dry rubber per tree per tapping and as percentage of control in parentheses.

I claim:
1. A compound which is hydrolyzable in the presence of water to produce ethylene and having the formula:

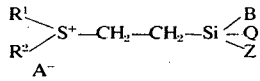

wherein each of $R^1$ and $R^2$ are an aliphatic or aromatic hydrocarbon containing from 1 to 8 carbon atoms;
$A^-$ is a non-phytotoxic anion, and B, Q and Z may be all the same or different and each is selected from the group:
i. halogen,
ii. alkyl having from 1 to 18 carbon atoms,
iii. alkoxy having from 1 to 18 carbon atoms,
iv. aryl,
v. hydroxy,
vi. thio or alkythio,
vii. dialkylamino, (viii) 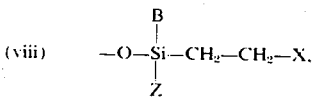

ix. $-CH_2-CH_2-X$
x. substituted alkyl or alkoxy.

2. A compound as claimed in claim 1, wherein X is:

and each of B, Q and Z is an aliphatic hydrocarbon group or an alkoxy group containing from 1 to 8 carbon atoms.

3. A compound according to claim 1 wherein B, Q and Z are methoxy, and X is

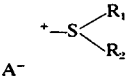

wherein $A^-$ is iodide, $R_1$ is methyl and $R_2$ is 2-hexyl.

* * * * *